United States Patent
Obergfaell et al.

(10) Patent No.: US 10,641,213 B2
(45) Date of Patent: May 5, 2020

(54) WATER INJECTION DEVICE OF AN INTERNAL COMBUSTION ENGINE

(71) Applicant: Robert Bosch GmbH, Stuttgart (DE)

(72) Inventors: Simon Obergfaell, Waiblingen (DE); Ingmar Burak, Stuttgart (DE); Peter Schenk, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 15/567,556

(22) PCT Filed: Apr. 18, 2016

(86) PCT No.: PCT/EP2016/058516
§ 371 (c)(1),
(2) Date: Oct. 18, 2017

(87) PCT Pub. No.: WO2016/177560
PCT Pub. Date: Nov. 10, 2016

(65) Prior Publication Data
US 2018/0119649 A1     May 3, 2018

(30) Foreign Application Priority Data

May 7, 2015   (DE) .................. 10 2015 208 502

(51) Int. Cl.
*F02B 47/02*     (2006.01)
*F02M 25/022*   (2006.01)
(Continued)

(52) U.S. Cl.
CPC ...... *F02M 25/0227* (2013.01); *F02M 25/025* (2013.01); *F02M 25/0221* (2013.01);
(Continued)

(58) Field of Classification Search
CPC .... F02B 47/02; F02M 25/0222; F02M 25/025
(Continued)

(56) References Cited

U.S. PATENT DOCUMENTS 3,845,745 A * 11/1974 Dunlap ................. F02B 47/02
                                                    123/25 L
4,279,223 A    7/1981 Csonka et al.
(Continued)

FOREIGN PATENT DOCUMENTS

CN       1435562 A     8/2003
FR       2484543 A1   12/1981
(Continued)

OTHER PUBLICATIONS

International Search Report dated Jul. 22, 2016, of the corresponding International Application PCT/EP2016/058516 filed Apr. 18, 2016.

*Primary Examiner* — Long T Tran
*Assistant Examiner* — James J Kim
(74) *Attorney, Agent, or Firm* — Norton Rose Fulbright US LLP; Gerard Messina

(57) ABSTRACT

A water injection device of an internal combustion engine, including a water tank for storing water, at least one water injector, a conveying element for conveying water from the water tank into the water injector, and a shut-off element, which is situated in an area between the conveying element and the water injector, and which is configured to maintain a system pressure between the shut-off element and the water injector at a level such that water situated in the area is prevented from evaporating. An internal combustion engine, which includes a water injection device.

12 Claims, 2 Drawing Sheets

(51) Int. Cl.
*F02M 25/025* (2006.01)
*F02M 25/028* (2006.01)

(52) U.S. Cl.
CPC ....... *F02M 25/028* (2013.01); *F02M 25/0222* (2013.01); *Y02T 10/121* (2013.01)

(58) Field of Classification Search
USPC .............................................. 123/25 C, 25 J
See application file for complete search history.

(56) References Cited

U.S. PATENT DOCUMENTS

| | | | |
|---|---|---|---|
| 4,396,347 A | 8/1983 | Chang | |
| 4,461,245 A | 7/1984 | Vinokur | |
| 4,960,080 A * | 10/1990 | O'Neill | F02B 47/02 123/25 A |
| 5,125,366 A * | 6/1992 | Hobbs | F02B 47/02 123/25 C |
| 5,682,842 A * | 11/1997 | Coleman | F02B 47/02 123/25 C |
| 7,367,306 B1 * | 5/2008 | Holden | F02B 47/02 123/25 C |
| 2006/0005802 A1 * | 1/2006 | Lewis | F01L 1/38 123/198 F |
| 2008/0001473 A1 * | 1/2008 | Mizutani | B60T 8/365 303/113.5 |
| 2008/0097679 A1 * | 4/2008 | Keays | F02B 47/02 701/102 |
| 2010/0313831 A1 * | 12/2010 | Szybist | F02B 47/02 123/64 |
| 2014/0196687 A1 * | 7/2014 | Coldren | F02D 19/0642 123/299 |

FOREIGN PATENT DOCUMENTS

| | | |
|---|---|---|
| GB | 2357318 A | 6/2001 |
| GB | 2497770 A | 6/2013 |
| JP | 2002317642 A | 10/2002 |
| JP | 2010248988 A | 11/2010 |
| WO | 03089775 A1 | 10/2003 |
| WO | 03089776 A1 | 10/2003 |
| WO | 2005088114 A1 | 9/2005 |
| WO | 2014080266 A1 | 5/2014 |

* cited by examiner

WATER INJECTION DEVICE OF AN INTERNAL COMBUSTION ENGINE

FIELD

The present invention relates to a water injection device of an internal combustion engine and to an internal combustion engine of this type.

BACKGROUND INFORMATION

Due to increasing demands for reduced carbon dioxide emissions, internal combustion engines are increasingly optimized with respect to fuel consumption. However, conventional internal combustion engines may not be optimally operated in operating points having high load with respect to consumption, since the operation is limited due to a knocking tendency and high exhaust gas temperatures. One potential measure for reducing the knocking tendency and for lowering the exhaust gas temperatures is the injection of water. In this case, separate water injection systems are normally present to enable the injection of water. Thus, for example, a water injection system for an internal combustion engine having an exhaust gas recirculation system is described in PCT App. No. WO 2014/080266 A1, in which the water is injected into the mass flow of the exhaust gas recirculation.

The pump used to convey the water is switched off between the operating points in which the water injection system is activated. This means that the water in the injectors and in the lines of the water injection system is standing. Because of the high temperatures of the parts of the internal combustion engine close to the water injection system, the standing water may heat up and possibly evaporate. This effect is intensified when driving at high elevations, where the air pressure is lower. The formation of vapor may result in functional impairments when restarting the water injection system, since the system pressure may be only slowly built up as a result of the vapor. This delays the operational readiness of the water injection system. This delayed operational readiness may result in temperature peaks in the exhaust gas as well as in incidences of knocking in the combustion during sudden load variations.

SUMMARY

The water injection device of an internal combustion engine according to the present invention may have the advantage that the system pressure may be maintained above the vapor pressure of the water even during inactive phases of the water injection device. Thus, a formation of water vapor is avoided and short pressure build-up times and a rapid injection release are ensured. This is achieved according to the present invention by the provision of a shut-off element in the water injection device, which serves to maintain the system pressure in one area of the water injection device during inactive water injection. The water injection device according to the present invention includes a water tank for storing water, at least one water injector, a conveying element for conveying water from the water tank into the water injector, and a shut-off element, which is situated in the area between the conveying element and the water injector, and which is configured to maintain a system pressure between the shut-off element and the water injector at a level such that the water situated in the area is prevented from evaporating.

Preferred refinements of the present invention are described herein.

The shut-off element is preferably designed as a shut-off valve. The shut-off valve ensures that water in the area between the water tank and the water injector is standing.

The shut-off valve is particularly preferably configured to be moved to an open position during active water injection, in particular, by a current feed. The shut-off valve is designed preferably as an electrically operated shut-off valve, which may be controlled by a control unit in a simple and precise manner. During active water injection, the shut-off valve is energized and thereby enables water to be conveyed from the water tank into the water injector. When the water injection is deactivated, the shut-off valve is also switched off and thus maintains the system pressure at a pressure level sufficient to prevent the warming water from boiling.

According to one alternative preferred embodiment of the present invention, the shut-off element may include a check valve. The check valve allows the flow of water only in the direction from the water tank to the water injector. Thus, an evaporation of the water in the area between the shut-off element and the water injector is avoided.

The check valve is particularly preferably configured to be currentlessly opened. In this case, a closure element of the check valve is released by the flowing fluid without current feed.

The shut-off element is advantageously configured to be currentlessly closed. The shut-off element is closed by a restoring force, for example, by a spring element.

In the case of a change in the operating direction of the conveying element, the shut-off element is preferably configured, to be moved into the open position, in particular, by a current feed. Thus, by a simple controlling of the shut-off element, water may be fed back into the water tank.

The shut-off element is preferably configured to maintain the system pressure in the area between the shut-off element and the water injector at a level greater than $3 \times 10^5$ Pa, preferably greater than $5 \times 10^5$, particularly preferably greater than $5 \times 10^5$ and less than $10 \times 10^5$. Thus, on the one hand, a formation of vapor in the area between the shut-off element and the water injector may be prevented and, on the other hand, a wetting of the wall of the inlet port by water may be prevented when water is injected into an inlet port of an internal combustion engine.

According to another advantageous embodiment of the present invention, the device includes a plurality of water injectors, which are connected to a distributor, the distributor being situated in the area between the shut-off element and the water injectors.

Another aspect of the present invention relates to an internal combustion engine, which includes a water injection device according to the present invention. The advantages obtained with respect to the device according to the present invention are obtained here as well.

The internal combustion engine is in particular preferably operated according to the Otto principle and with gasoline. The internal combustion engine operated according to the Otto principle is to be understood as an internal combustion engine in which gasoline or a gasoline-air mixture is combusted by spark ignition in the form of a spark plug. Since the ignition timing in such an internal combustion engine is precisely predetermined by the spark ignition, the advantages described with respect to the water injection device according to the present invention may be fully utilized. Because of the short pressure build-up times and the rapid injection release of the water injection device according to the present invention, it is also possible to avoid a knocking tendency in the case of rapid, sudden load variations.

BRIEF DESCRIPTION OF THE DRAWINGS

Exemplary embodiments of the present invention are described in detail below with reference to the figures, identical or functionally identical parts being designated in each case with the same reference numerals.

DETAILED DESCRIPTION OF EXAMPLE EMBODIMENTS

A water injection device 1 of an internal combustion engine 2 according to a first exemplary embodiment is described in detail below with reference to the FIGS. 1 and 2. Internal combustion engine 2 is operated, in particular, according to the Otto principle and with direct gasoline injection.

Figure 1:
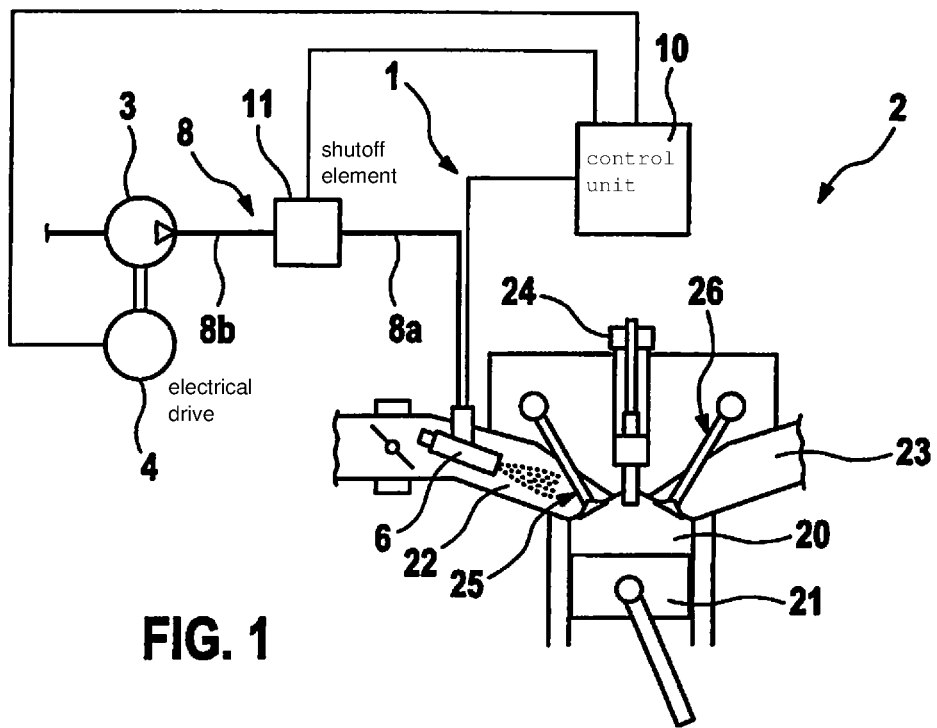
FIG. 1 shows a highly simplified schematic view of an internal combustion engine including a water injection device according to a first exemplary embodiment of the present invention.

Depicted schematically in FIG. 1 is internal combustion engine 2, which includes a plurality of cylinders, as well as a part of the water injection device 1 according to the present invention. Internal combustion engine 2 includes one combustion chamber 20 per cylinder, in which a piston 21 is movable back and forth. Internal combustion engine 2 also includes one inlet port 22 per cylinder, through which air is fed to combustion chamber 20. Exhaust gas is discharged through an exhaust port 23. For this purpose, an inlet valve 25 is situated at inlet port 22 and an outlet valve 26 is situated at exhaust port 23. Reference numeral 24 also refers to a fuel injector.

A water injector 6 is also situated at inlet port 22, which injects water into inlet port 22 of internal combustion engine 2 via a control unit 10. In this exemplary embodiment, one water injector 6 is provided per cylinder. Alternatively, two water injectors per cylinder may be situated for improved preparation or for increasing the maximum injectable quantity of water per combustion cycle.

Water injection device 1 further includes a conveying element 3 designed as a pump and an electrical drive 4 for driving the pump. As is apparent from FIG. 2, a water tank 5 is also provided, which is connected to conveying element 3 by a first line 7. A second line 8 connects conveying element 3 to a distributor 9 or to a rail, to which a plurality of water injectors 6 is connected.

According to the present invention, a shut-off element 11, which divides second line 8 into a first line section 8a and a second line section 8b and is controlled via control unit 10, is situated between conveying element 3 and distributor 9, respectively, the water injectors 6.

Shut-off element 11 is configured to maintain a system pressure between shut-off element 11 and water injectors 6 in first line section 8a of second line 8 at a level such that the water situated in first line section 8a is prevented from evaporating.

Shut-off element 11 in this case is designed as an electrical shut-off valve 11a. Shut-off valve 11a is a 2/2-way control valve.

Shut-off valve 11a is configured, in particular, to maintain the system pressure in first line section 8a of second line 8 at a level greater than $3 \times 10^5$ Pa. To enable an optimal water injection and thus also an optimal combustion, shut-off valve 11a is configured in such a way that the system pressure in first line section 8a is also maintained lower than $10 \times 10^5$ Pa.

Shut-off valve 11a is, in particular, designed in such a way that it is currentlessly closed, for example, by a closing force of a spring element 12. During a deactivated water injection, shut-off valve 11a is switched off and maintains the system pressure at a level sufficient to prevent a formation of vapor (first switch position of shut-off valve 11a). During an activation of the water injection, shut-off valve 11a is energized and thereby enables the water to be conveyed to water injectors 6 (second switch position of shut-off valve 11a).

Shut-off valve 11a is further configured to be opened by a current feed (second switch position of shut-off valve 11a) in the case of change of the rotation direction of the pump, in which water is fed back into water tank 5.

Figure 2:
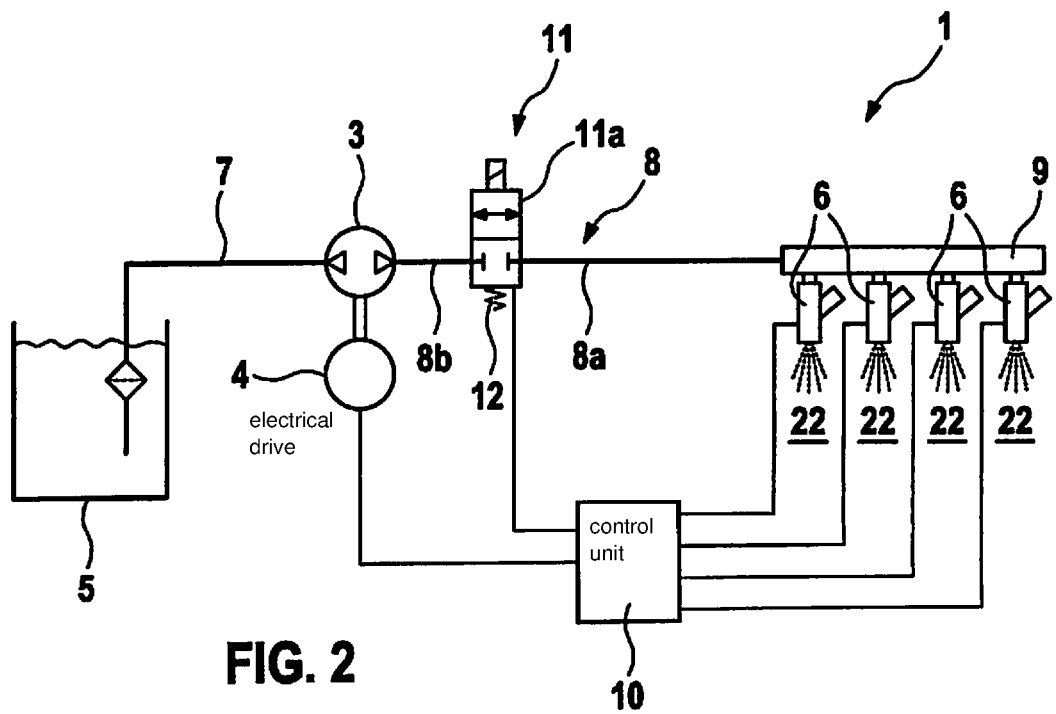
FIG. 2 shows a simplified schematic view of the water injection device according to the first exemplary embodiment.

Shut-off valve 11a in FIG. 2 is situated in the first switch position, i.e., in the closed position.

By providing a shut-off element 11 between conveying element 3 and the plurality of water injectors 6, it is possible to prevent a formation of vapor in water injection device 1 according to the present invention. Thus, water injection device 1 is operational at inactive operating points and may be quickly put into operation if the combustion of internal combustion engine 2 requires a water injection.

Figure 3:
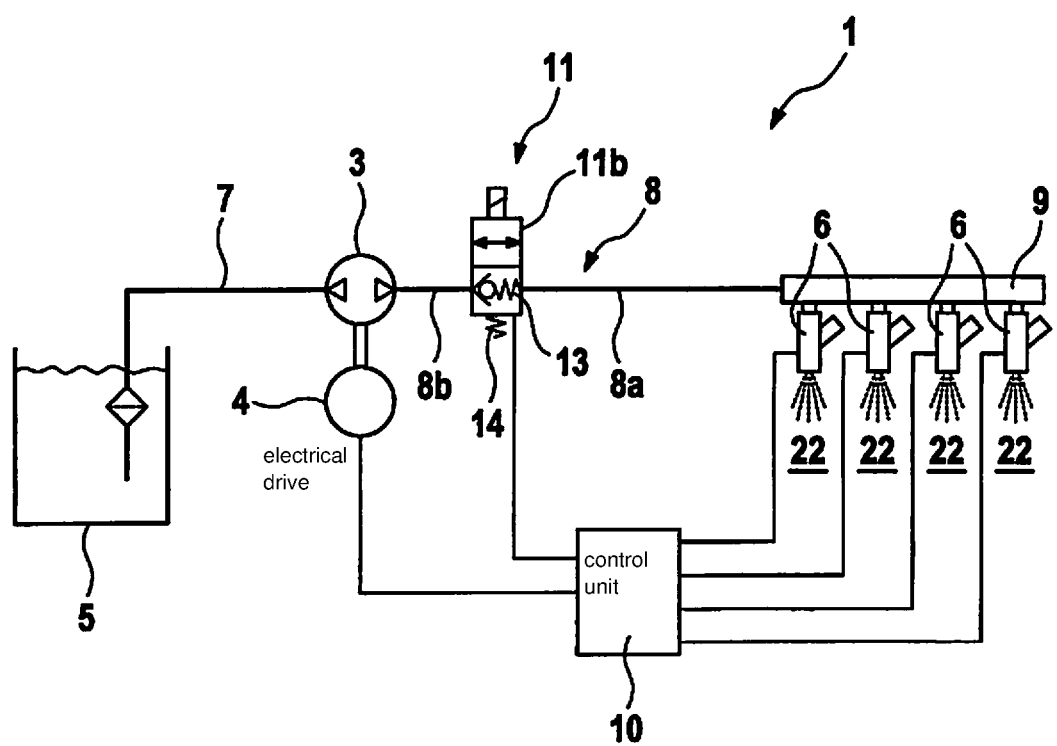
FIG. 3 shows a simplified schematic view of the water injection device according to a second exemplary embodiment of the present invention.

The second exemplary embodiment of water injection device 1 according to the present invention of FIG. 3 differs, in principle, from the first exemplary embodiment, in that instead of a shut-off valve 11a, a shut-off element 11 is situated in second line 8 which includes a check valve 11b.

Shut-off valve 11 is designed, in particular, as a 2/2-way control valve. Check valve 11b is configured to be currentlessly opened (open position of check valve 11b) by a pressure of the water in second line section 8b, which acts against, for example, a force of a spring element 13. If the pressure in second line section 8b is no longer able to overcome the force of spring element 13 and the pressure of the water situated in first line section 8a, check valve 11b closes (closed position). The open and closed positions of check valve 11b correspond to a first switch position of shut-off element 11. In FIG. 3, shut-off element 11 is in the first switch position and check valve 11b is in the closed position.

In the event of a change in the operating direction of conveying element 3, shut-off element 11 is configured to be moved into a second switch position by a current feed. In this switch position, water is fed into water tank 5. Shut-off element 11 is moved from the second switch position back into the first switch position, for example, by a restoring force of a spring element 14. Since a current feed is necessary only when water is suctioned back into water tank 5, shut-off element 11 together with check valve 11b offers the advantage of a reduced control effort, as a result of which the corresponding costs may be reduced.

What is claimed is:

1. A water injection device of an internal combustion engine having a plurality of cylinders, comprising:
   a water tank to store water;
   a plurality of water injectors, wherein at least one water injector is assigned to each of the cylinders;

a conveying element to convey water via a first line from the water tank into the water injector via a second line; and a shut-off element, which is situated in an area between the conveying element and the water injector, to maintain a system pressure between the shut-off element and the water injectors in a first line section of the second line between the shut-off element and the water injector at a level such that water situated in the first line section of the second line is prevented from evaporating, wherein during a deactivated water injection, the shut-off element is switched off and maintains the system pressure at a level sufficient to prevent a formation of vapor, and wherein the shut-off element is configured to be opened by a current feed change of the rotation direction of the conveying element, which is a pump, in which water is fed back into the water tank;

wherein the shut-off element divides the second line into the first line section and a second line section and is controlled via a control unit, which is situated between the conveying element and a distributor, which distributes the water into the plurality of water injectors, wherein the distributor is a rail to which the plurality of water injectors is connected, and wherein the control unit is connected to an electrical drive which drives the conveying element, and is further connected to the shut-off element, which is an electrical shut-off valve, and is further connected to each of the water injectors.

2. The water injection device as recited in claim 1, wherein the shut-off element includes a shut-off valve.

3. The water injection device as recited in claim 1, wherein the shut-off element is moveable into an open position during active water injection by a current feed.

4. The water injection device as recited in claim 1, wherein the shut-off element includes a check valve.

5. The water injection device as recited in claim 4, wherein the check valve is configured to be currentlessly opened.

6. The water injection device as recited in claim 1, wherein the shut-off element is configured to be currentlessly closed.

7. The water injection device as recited in claim 1, wherein the shut-off element is moveable into the open position by a current feed in the event of a change in an operating direction of the conveying element.

8. The water injection device as recited in claim 1, wherein the shut-off element is configured to maintain the system pressure in the first line section of the second line between the shut-off element and the water injector at a level greater than $3\times10^5$ Pa and less than $10\times10^5$ Pa.

9. The water injection device as recited in claim 1, wherein the shut-off element is configured to maintain the system pressure in the first line section of the second line between the shut-off element and the water injector at a level greater than $5\times10^5$ Pa and less than $10\times10^5$ Pa.

10. The water injection device as recited in claim 1, wherein each of the plurality of water injectors are connected to the distributor, the distributor being situated in an area between the shut-off element and the water injectors.

11. An internal combustion engine, including a plurality of cylinders a water injection device of an internal combustion engine, comprising:

a water tank to store water;

a plurality of water injectors, wherein at least one water injector is assigned to each of the cylinders;

a conveying element to convey water via a first line from the water tank into the water injector via a second line; and a shut-off element, which is situated in an area between the conveying element and the water injector, to maintain a system pressure between the shut-off element and the water injectors in a first line section of the second line between the shut-off element and the water injector at a level such that water situated in the first line section of the second line is prevented from evaporating, wherein during a deactivated water injection, the shut-off element is switched off and maintains the system pressure at a level sufficient to prevent a formation of vapor, and wherein the shut-off element is configured to be opened by a current feed change of the rotation direction of the conveying element, which is a pump, in which water is fed back into the water tank;

wherein the shut-off element divides the second line into the first line section and a second line section and is controlled via a control unit, which is situated between the conveying element and a distributor, which distributes the water into the plurality of water injectors, wherein the distributor is a rail to which the plurality of water injectors is connected, and wherein the control unit is connected to an electrical drive which drives the conveying element, and is further connected to the shut-off element, which is an electrical shut-off valve, and is further connected to each of the water injectors.

12. The internal combustion engine as recited in claim 11, wherein the internal combustion engine is configured to be operated according to the Otto principle and with gasoline.

* * * * *